United States Patent
Paxton et al.

(10) Patent No.: US 11,369,083 B1
(45) Date of Patent: Jun. 28, 2022

(54) TRAIL BOOT

(71) Applicant: Cosmic Pet Brands LLC, Wayne, PA (US)

(72) Inventors: Stephen E. Paxton, Brainerd, MN (US); Lisa M. Lugo-Paxton, Brainerd, MN (US)

(73) Assignee: COSMIC PET BRANDS LLC, Wayne, PA (US)

( * ) Notice: Subject to any disclaimer, the term of this patent is extended or adjusted under 35 U.S.C. 154(b) by 1203 days.

(21) Appl. No.: 15/246,524

(22) Filed: Aug. 24, 2016

Related U.S. Application Data (63) Continuation-in-part of application No. 14/642,743, filed on Mar. 9, 2015, now abandoned.

(60) Provisional application No. 62/250,462, filed on Nov. 3, 2015, provisional application No. 61/949,240, filed on Mar. 7, 2014.

(51) Int. Cl.
 *A01K 13/00* (2006.01)
 *A43B 13/22* (2006.01)

(52) U.S. Cl.
 CPC .......... *A01K 13/007* (2013.01); *A43B 13/223* (2013.01)

(58) Field of Classification Search
 CPC ... A01K 13/006; A01K 13/007; A43B 13/223
 USPC .......................................................... 36/111
 See application file for complete search history.

(56) References Cited

U.S. PATENT DOCUMENTS

| | | | |
|---|---|---|---|
| 630,310 | A | 8/1899 | Agnew |
| 866,423 | A | 9/1907 | Bellatty |
| 1,354,972 | A | 10/1920 | Hess |
| 1,656,564 | A | 1/1928 | Lyon |
| 1,687,459 | A | 10/1928 | Lyon |
| 1,687,460 | A | 10/1928 | Lyon |
| 1,854,183 | A | 4/1932 | Fallon, Jr. |
| 1,911,956 | A | 5/1933 | Jennings |
| 1,961,345 | A | 6/1934 | Fallon, Jr. |
| 2,004,117 | A | 6/1935 | Jennings |
| 2,064,566 | A | 12/1936 | Richman |
| 2,201,382 | A | 5/1940 | Vizard |
| 2,222,705 | A | 11/1940 | Conlon |
| 2,408,650 | A | 10/1946 | Jennings |

(Continued)

FOREIGN PATENT DOCUMENTS

| | | |
|---|---|---|
| CA | 2486628 C | 6/2015 |
| JP | 2004254606 A | 9/2004 |

(Continued)

*Primary Examiner* — Sharon M Prange
(74) *Attorney, Agent, or Firm* — Global IP Counselors, LLP (57) ABSTRACT

A canine trail boot has a molded sole having raised lugs that conform to the pad shape of a dog's foot. These lugs divide the sole into individual pad cups, each that receive a single pad from the dog foot. Features are provided that allow some independent movement between adjacent pad cups that better replicates a dog's pad movement. The molded sole may include a toe having unidirectional treads, and may also include a tail having a combination of treads that also receive and retain straps, and a raised protrusion that engages with an indentation on a dog's paw to retain a boot securely. The sole interior may be layered with one or more insoles that provide the selection of puncture resistance, heat isolation or reflection, and other custom interior features.

14 Claims, 10 Drawing Sheets

(56) References Cited

U.S. PATENT DOCUMENTS

| | | | |
|---|---|---|---|
| 2,424,172 A * | 7/1947 | Huddleston | A01K 13/007 36/111 |
| 2,443,831 A * | 6/1948 | Miller | A01K 13/006 36/111 |
| 2,446,371 A | 8/1948 | Jones | |
| 2,535,394 A | 12/1950 | Davis | |
| 2,651,853 A | 9/1953 | Lewis | |
| 2,700,231 A | 1/1955 | Vizard | |
| 2,754,600 A | 7/1956 | Vizard | |
| 3,150,641 A | 9/1964 | Kesh | |
| 3,286,375 A | 11/1966 | Troy | |
| 3,304,630 A | 2/1967 | Sherbrook | |
| 3,742,679 A | 7/1973 | Jordan | |
| 3,747,565 A | 7/1973 | Kellam | |
| 3,762,073 A | 10/1973 | Cantales | |
| D229,197 S | 11/1973 | Jackson | |
| 3,794,119 A * | 2/1974 | Paiso | A01L 3/00 168/18 |
| 4,045,888 A * | 9/1977 | Oxenberg | A43B 5/00 36/114 |
| 4,457,261 A | 7/1984 | Marshall | |
| 4,458,431 A * | 7/1984 | Sinclair | A43B 11/00 36/111 |
| 4,543,911 A | 10/1985 | Marshall | |
| 4,548,026 A | 10/1985 | Shidner | |
| 4,633,817 A | 1/1987 | Taylor | |
| 4,744,333 A | 5/1988 | Taylor | |
| 4,931,773 A | 6/1990 | Rosen | |
| 4,967,542 A | 11/1990 | MacDonald | |
| 5,014,041 A | 5/1991 | Rosen | |
| 5,137,508 A | 8/1992 | Engman | |
| 5,148,657 A * | 9/1992 | Stafford | A01K 13/007 168/1 |
| 5,209,048 A | 5/1993 | Hanson | |
| 5,211,672 A | 5/1993 | Andujar | |
| 5,385,036 A | 1/1995 | Spillane et al. | |
| 5,408,812 A | 4/1995 | Stark | |
| 5,452,685 A | 9/1995 | Thomas | |
| 5,490,337 A | 2/1996 | Zerbinati | |
| 5,495,828 A | 3/1996 | Solomon et al. | |
| D379,251 S | 5/1997 | Mezey | |
| 5,633,064 A | 5/1997 | Ragland et al. | |
| 5,658,634 A | 8/1997 | Ragland et al. | |
| 5,676,095 A | 10/1997 | Ralls | |
| D387,511 S | 12/1997 | Caditz | |
| 5,715,661 A | 2/1998 | Meyers | |
| 5,813,144 A | 9/1998 | Prengler | |
| 5,926,843 A | 7/1999 | Winchester | |
| 5,937,542 A | 8/1999 | Bourdeau | |
| 5,983,526 A | 11/1999 | Pawlik et al. | |
| 5,996,255 A | 12/1999 | Ventura | |
| 6,186,097 B1 | 2/2001 | Brockmann et al. | |
| 6,226,898 B1 | 5/2001 | Trimble et al. | |
| 6,319,864 B1 | 11/2001 | Hannigan et al. | |
| 6,470,832 B1 * | 10/2002 | Peacock | A01K 13/007 119/850 |
| 6,526,920 B1 * | 3/2003 | Griffin | A01K 13/007 119/850 |
| 6,546,704 B1 | 4/2003 | Fisher | |
| 6,786,029 B2 | 9/2004 | Kuzuu | |
| 6,851,394 B1 | 2/2005 | Young | |
| 6,863,033 B1 | 3/2005 | Fleming | |
| 6,931,767 B2 | 8/2005 | Royle | |
| 6,973,742 B2 | 12/2005 | Gordon | |
| 7,174,858 B2 | 2/2007 | Ford | |
| 7,185,612 B2 | 3/2007 | Faulk | |
| 7,677,206 B1 | 3/2010 | Southworth | |
| 7,971,557 B2 | 7/2011 | Paxton et al. | |
| 8,109,241 B2 * | 2/2012 | Wrenwood Maloney | A01K 13/007 119/850 |
| 8,113,152 B1 * | 2/2012 | Paxton | A01K 13/006 119/850 |
| 8,176,880 B2 * | 5/2012 | Hurwitz | A61D 9/00 119/850 |
| 8,567,350 B2 | 10/2013 | Wrenwood Maloney et al. | |
| 8,621,765 B2 | 1/2014 | Geer et al. | |
| 2003/0115777 A1 | 6/2003 | Hall et al. | |
| 2005/0092260 A1 * | 5/2005 | Paxton | A01K 13/007 119/850 |
| 2005/0188925 A1 * | 9/2005 | Yun | A01K 13/007 119/850 |
| 2005/0241188 A1 * | 11/2005 | Yun | A01K 13/007 36/111 |
| 2007/0039565 A1 | 2/2007 | Krottinger | |
| 2007/0044734 A1 * | 3/2007 | Maloney | A01K 13/007 119/850 |
| 2007/0175409 A1 * | 8/2007 | Vogelman | A01K 13/007 119/850 |
| 2007/0175410 A1 * | 8/2007 | Vogelman | A01K 13/007 119/850 |
| 2011/0036307 A1 * | 2/2011 | Walker | A01K 13/001 119/851 |
| 2011/0041779 A1 * | 2/2011 | Hurwitz | A01K 13/007 119/850 |
| 2011/0041780 A1 * | 2/2011 | Hurwitz | A01K 13/007 119/850 |
| 2011/0214221 A1 | 9/2011 | Munda | |
| 2011/0265733 A1 | 11/2011 | Paxton et al. | |
| 2011/0277702 A1 | 11/2011 | Taslakian | |
| 2014/0150299 A1 | 6/2014 | Entler | |
| 2014/0174379 A1 | 6/2014 | Kissel, Jr. | |
| 2014/0318478 A1 | 10/2014 | Cruz | |

FOREIGN PATENT DOCUMENTS

| | | |
|---|---|---|
| KR | 200371823 Y1 | 1/2005 |
| WO | WO 2007051121 A2 | 5/2007 |
| WO | WO 2014071462 A1 | 5/2014 |

* cited by examiner

TRAIL BOOT

CROSS REFERENCE TO RELATED APPLICATIONS

This application is a Continuation-In-Part of U.S. patent application Ser. No. 14/642,743 filed Mar. 9, 2015, which in turn claims the benefit of U.S. provisional patent application 61/949,240 filed Mar. 7, 2014 of the same title and inventorship, the contents which are incorporated by reference in entirety.

BACKGROUND OF THE INVENTION

1. Field of the Invention

This invention pertains generally to the field of animal husbandry, and more particularly to protective dog boots.

2. Description of the Related Art

Dogs have long been known as "man's best friend". Not only do dogs provide companionship, they are also intelligent and readily taught to carry out many tasks that are complementary to those of other public servants. As a result, they can provide great benefit, often times in situations where humans would not be capable. These animals serve very diverse functions, providing companionship, guarding, towing, hunting, rescue, and even sensory conversion, such as a seeing eye-dog or a hearing-assist dog. They may be pets, or may be put in service by individuals or organizations such as search and rescue teams, police, or military organizations.

Regardless of the relationship between person and dog, at various times, and for many diverse reasons, it may be highly desirable for the dog owner to place boots upon the dog's paws. For example, in inclement weather, a person may not wish to try to clean a dog's paws after the dog has been outside. Boots that may be placed and then readily removed may be much easier to use than what might be required to thoroughly clean the dog's feet. In other instances, a dog may have injured one or more paws, and so may not have the usual toughness. In such case, a suitable boot may help to protect the affected paw until sufficient healing has occurred to no longer require the boot. In other cases, the dog's pads may be inadequate for traversing the ground when temperatures are particularly severe, such as in colder climates or with dogs that are not adapted to the cold, or conversely in extremely hot climates where the ground surface may be scorching. Racing and sled dogs may be exposed to a particularly harsh course or environment, and so may also need special protection. Boots can be used to prevent snow from getting up between the pads of the foot, freezing, abrading the soft tissue, and thereby producing a lame dog. A dog's paws are also not well designed for traction on a variety of hard surfaces, such as smooth rocks, ice, finished wood, various harder plastics, and the like. Boots can provide substantial traction on such surfaces.

A number of artisans have recognized one or more of the foregoing needs, and so have designed various dog boots. One such patent which exemplifies these known boots is U.S. Pat. No. 6,526,920 by Griffin, entitled "Dog boot for hunting and other outdoor activities," the teachings which are incorporated herein by reference. This patent describes dog boots having a zipper and dual hook-and-loop leg fasteners with loops for tightening, and a non-skid sole. Additional patents that offer useful teachings and insights are incorporated by reference, including U.S. patents Des. 379,251 by Mezey; Des. 387,511 by Caditz; U.S. Pat. No. 2,064,566 by Richman; U.S. Pat. No. 2,651,853 by Lewis; U.S. Pat. No. 3,762,073 by Cantales; U.S. Pat. Nos. 4,457, 261 and 4,543,911 by Marshall; U.S. Pat. No. 4,458,431 by Sinclair, entitled "Boot for pet animal"; U.S. Pat. No. 4,967,542 by MacDonald, entitled "Dog boots"; U.S. Pat. No. 5,408,812 by Stark; U.S. Pat. No. 5,148,657 by Stafford et al; U.S. Pat. No. 5,452,685 by Thomas; U.S. Pat. No. 6,470,832 by Peacock, entitled "Animal boots"; U.S. Pat. Nos. 8,109,241 and 8,567,350 by Wrenwood Maloney, entitled "Dog boot"; and US published application 2011/0041779 by Hurwitz, entitled "Therapeutic pet boot".

However, these prior art boots tend to suffer from several common limitations. As may be recognized, prior art dog boots are often very difficult to put on the dog's foot. This problem will be intensified by the fact that most dogs will not remain still while a person is trying to put the boot on. Once on, these prior art boots do not stay on well. Many will simply spin about, potentially causing much discomfort or harm to the dog. Others will slide off as the dog walks or runs, much like loose socks coming off of a person walking on carpet. This phenomenon is quite significant, since the boot must be designed to be of non-slip material, or the dog will sprawl on finished wood, icy or other relatively slippery surfaces. Yet, the boot must also preferentially stay on the dog's paw, rather than slide with respect thereto, even when the booted dog is traversing terrain having good traction. Simply applying more force about the dog's leg to keep the boot on has proven to be totally unsatisfactory, since circulation within the leg may become limited or disrupted. Unintended bunching of the boot top can be harder to detect, and can also restrict circulation. Yet, different dogs will have significantly different proportions between pad size and leg diameter, meaning that the boot must be very adjustable to accommodate different dog breeds and sizes. Finally, complex boots are not only more difficult to put on the dog, but they are also much more expensive to produce, which is also undesirable.

While many different types of human boots and those for other diverse animals such as horses have been devised, boots from these anatomically diverse animals have found little practical utility with dogs. In the leg of any human or animal, when a boot or covering is applied, circulation must be preserved. In the case of a human foot, this can easily be achieved by not over-tightening the laces or other bindings, and instead relying upon the approximately ninety-degree bend between the human leg and foot, and the bulging calcaneus bone. The human leg dramatically increases in diameter due to the calcaneus bone. Consequently, a wrap about the lower leg including the tibia and fibula will not pass around or "slide past" the calcaneus or heel bone.

In contrast to the human foot skeletal structure, a dog walks "tip-toe" compared to a human. The dog foot is of much more consistent diameter, and does not have a bulge such as found in the human calcaneus bone. Consequently, the shape of a dog foot causes prior art boots to be readily slipped off by the dog during ordinary movement, and human boots have no co-operative anatomy similar to the human calcaneus or heel bone in the dog foot with which to engage.

A front dog paw, left-to-right, has almost no dimensional change. The dog leg does not suddenly expand into a much larger paw, but instead remains very close in size and diameter. The exact dimensions of dog legs and paws vary among different dog breeds, but it is important to recognize that many breeds have very little change in diameter along the length of the dog foot, and so the calcaneus human bone is not available on the "tip-toe" dog leg.

A number of artisans discuss such materials as leather, neoprene, and PVC for applications similar to those for which the present invention is intended. These patents, the contents which are incorporated herein by reference, include 2,424,172 by Huddleston, entitled "Animal boot"; U.S. Pat. No. 2,535,394 by Davis, entitled "Shoe for hunting dogs"; U.S. Pat. No. 5,495,828 by Solomon et al, entitled "Animal boots with detachable, vertically adjustable fastening strap"; U.S. Pat. No. 6,186,097 by Brockmann et al, entitled "Protection shoe for the paw of a dog"; U.S. Pat. No. 6,526,920 by Griffin, entitled "Dog boot for hunting and other outdoor activities"; U.S. Pat. No. 6,786,029 by Kuzuu, entitled "Pet nail cover"; and U.S. Pat. No. 6,931,767 by Royle, entitled "Foot cover". While these materials provide improved protection over prior art fabrics, they are inadequate to maintain desired temperature differentials, and they suffer from many of the drawbacks already mentioned herein above.

Additional patents for which the teachings are incorporated herein by reference include: U.S. Pat. No. 2,222,705 by Conlon, entitled "Dog cover"; U.S. Pat. No. 2,446,371 by Jones, entitled "Dog boot"; U.S. Pat. No. 3,150,641 by Kesh, entitled "Dust cover for dog"; U.S. Pat. No. 3,742,679 by Jordan, entitled "Stretchable pet suit with boots"; U.S. Pat. No. 3,747,565 by Kellam, entitled "Article of Animal Apparel"; U.S. Pat. No. 4,633,817 by Taylor, entitled "Protective footwear for animals"; U.S. Pat. No. 4,744,333 by Taylor, entitled "Protective footwear for animals"; U.S. Pat. No. 5,676,095 by Ralls, entitled "Protective paw coverings for animals"; U.S. Pat. No. 6,546,704 by Fisher, entitled "Dog boot"; and U.S. Pat. No. 6,851,394 by Young, entitled "Boot and harness swimming system for an animal".

In addition to the foregoing, the present applicants have also illustrated a variety of protective dog boots, the teachings and contents of each which are incorporated herein by reference, including U.S. Pat. Nos. 7,971,557; 8,113,152; 9,485,962; 9,497,932; and PCT application WO 2009/120723. Webster's New Universal Unabridged Dictionary, Second Edition copyright 1983, is additionally incorporated herein by reference in entirety for the definitions of words and terms used herein.

SUMMARY OF THE INVENTION

In a first manifestation, the invention is a canine trail boot. The canine trail boot has a boot top, and a sole coupled to the boot top to define a paw receiving space there between. The sole has five pad cups including four digital pad cups and a fifth metatarsal metacarpal pad cup. Each of the five pad cups has a cup base exterior surface that is configured to be in ground contact and an interior surface that is configured to be in contact with a dog's pad. A cup sidewall rises vertically from the cup base and is configured to be substantially out of contact with a flat ground surface and is spaced in a portion adjacent to the ground surface by a void from a vertically rising side wall of an adjacent one of the five pad cups. A flexible lug couples the cup sidewall to the adjacent one of the five pad cups in a portion of the cup side wall distal to said cup base.

In a second manifestation, the invention is an animal boot. A boot top is coupled to a sole to define a paw receiving space there between. The sole has a flexible lug coupling at least two pad cups. Each of the at least two pad cups has a cup base exterior surface that is configured to be in ground contact and an interior surface that is configured to be in contact with a dog's pad. A cup sidewall rises vertically from the cup base and is configured to be substantially out of contact with a flat ground surface and spaced from a vertically rising side wall of an adjacent one of the at least two pad cups. A coupling is provided between the cup sidewall and flexible lug distal to the cup base. The flexible lug configured to be sufficiently pliable to permit each pad cup to move both up and down and side to side through at least a functional range effective to mimic independent pad motion in a dog that is relatively uninhibited by adjacent pad cups.

In a third manifestation, the invention is a unitary canine boot sole. A mid-base has an exterior configured for ground contact during locomotion, a leading portion that leads a trailing portion and which is distal on the mid-base relative to the trailing portion. A toe rises from the leading portion of the mid-base and has a plurality of unidirectional treads. A tail rises from the trailing portion of the mid-base. In some further manifestations, the tail may further comprise an omnidirectional tread, may further comprise a pair of generally linear treads spaced from each other and configured to engage with a ground surface, and may further be configured to receive and retain a tensioned strap there between. In other further manifestations, the toe unidirectional treads may comprise a right triangular prism geometry.

OBJECTS OF THE INVENTION

Exemplary embodiments of the present invention solve inadequacies of the prior art by providing a molded sole having raised lugs on the pad that conform to the pad shape of a dog's foot. These lugs divide the sole into individual sections that receive a single pad from the dog foot, with each section allowing some individual or independent movement that better replicates a dog's paw movement. The sole exterior may optionally incorporate means for attaching studs or other custom exterior features. The sole interior may be layered with one or more insoles that provide the selection of puncture resistance, heat isolation or reflection, and other custom interior features. The boot upper is preferably provided with a pad similar to that illustrated in our U.S. Pat. Nos. 7,971,557 and 8,113,152 and presently allowed US co-pending application Ser. Nos. 13/176,722 and 13/396,595 incorporated herein above.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a dog boot which is readily placed about a dog's paw. A second object of the invention is securement of the boot against slippage, spin, or separation with respect to the dog's leg, while simultaneously substantially reducing the risk of circulatory disruption or harm to the dog. Another object of the present invention is to ensure that the boot will readily accommodate a wide range of proportions of paw size to leg diameter. A further object of the invention is to provide a boot which is substantially non-slip with respect to a surface the dog is traversing, and which will preferably differentially grab the surface with more grip in the direction the dog is trying to apply force to than opposite thereto. An additional object of the invention is the provision of protection from temperature extremes and environment which might otherwise injure a dog's paw. Yet another object of the invention is to provide a more readily produced boot which is not unnecessarily complex or expensive to produce, and yet which is durable. An even further object of the invention is that the boot float for water usage. Another object of the invention is that the boot not unduly abrade the dog during use. An additional object of the invention is the provision of independent movement of individual pads within the dog's paw, providing a dog improved feel and comfort.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred and alternative embodiments, the present invention provides a molded sole 100 such as illustrated in FIGS. 1-6. Preferred embodiment molded sole 100 comprises a toe 110, a mid-base 120, and a tail 150 that may all optionally but preferably be formed or molded simultaneously. While preferred embodiment molded sole 100 is quite complex and has many features integrated therein, as will become apparent herein below, this complexity may be incorporated into a single mold that can be used to form many molded soles. This enables the manufacture of a boot having preferred embodiment molded sole 100 using common manufacturing techniques, thereby keeping the fabrication cost of each individual boot reasonably low. Nevertheless, other fabrication techniques may also be used, and so the present invention is not solely limited to the technique of molding.

Figure 3:
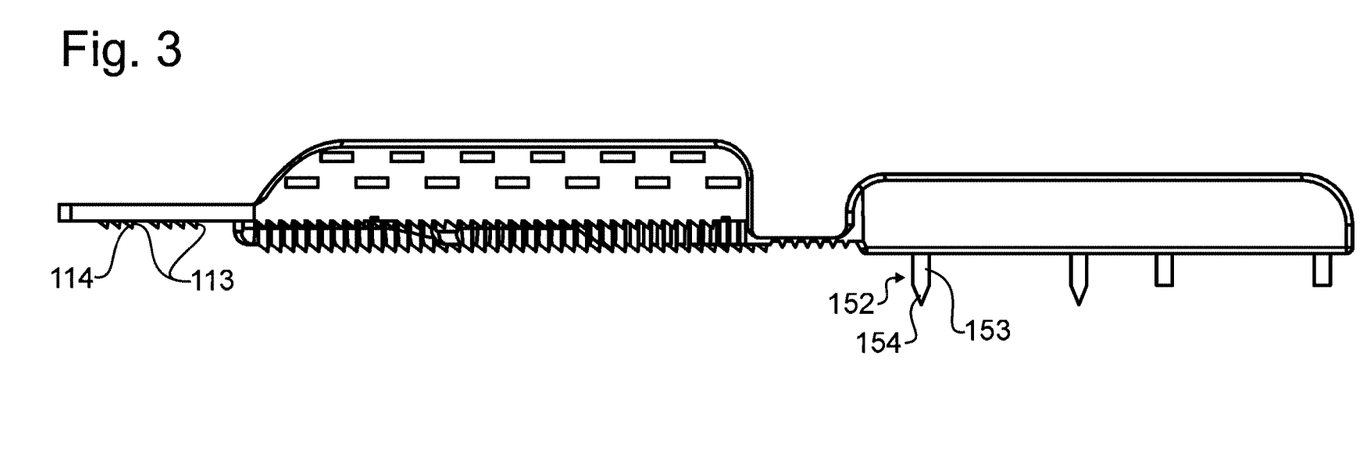
FIG. 3 illustrates the preferred embodiment molded sole of FIG. 1 from a side elevational view.
Figure 4:
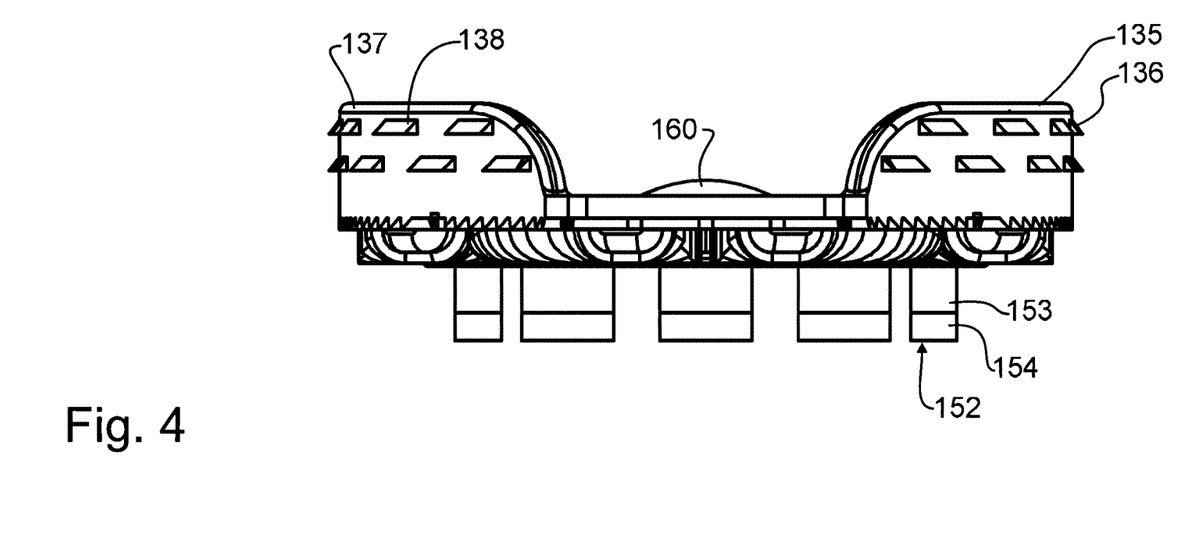
FIG. 4 illustrates the preferred embodiment molded sole of FIG. 1 from a front elevational view.

While not essential, in preferred embodiment molded sole 100 a toe 110 is preferably provided which is configured to roll over the tip of a boot to protect against dragging type abrasions on the tip of the boot. Toe 110 has a generally planar portion 111, and a plurality of treads 112. At least one, and preferably each of the plurality of treads 112 has a geometry of a right triangular prism. As best illustrated in FIG. 3, the geometry of treads 112 is such that the face 113 of the right triangle prism perpendicular to the generally planar portion 111 faces to the rear or toward tail 150. Consequently, when a dog is trying to pull or accelerate, this perpendicular face 113 is most aggressively grabbing into the ground or underlying surface to gain the best traction. When a dog is pulling or accelerating, they tend to shift forward on their paws, which would naturally cause their nails to dig into the ground surface. Since the dog's nails are preferably isolated from the ground by preferred embodiment molded sole 100, these treads 112 are designed to perform this function. However, when a dog is slowing down, or trying to stop, they will shift back on their paws toward the metacarpal and metatarsal pads, removing toe 110 from any contact with the underlying ground surface. Consequently, when not trying to pull or accelerate, any contact between the ground surface and toe 110 will in most instances be accidental, unintentional, or due to some problem or hindrance with the dog that will preferably not slow or stop the dog. By providing a face 114 in the right triangle prism geometry of treads 112 that is intermediate between parallel and perpendicular to generally planar portion 111, there will be less engagement with the ground and a greater tendency for toe 110 to skip, thus providing toe 110 with a coefficient of friction or force of engagement that will generally be much greater when pulling than when dragging. As may be apparent then, this right triangle prism geometry of treads 112 will preferably differentially grab the ground or surface with more grip in the direction the dog is trying to apply force to than opposite thereto.

Preferred embodiment molded sole 100 also comprises a mid-base 120 having a generally planar portion 121. Generally planar portion 121 of mid-base 120 is co-planar with generally planar portion 111 of toe 110, though there is no strict requirement that this be the case. A dog's foot has five pads, including four finger-type digital pads and the metacarpal or metatarsal pad, which is the large heart shaped pad at the rear. Extending in a generally downward manner below generally planar portion 121 are a plurality of digital pad cups 122, 123, 124, 125 and a metatarsal or metacarpal pad cup 126 that are each configured to receive and conform to the dog's digital pads and either metatarsal or metacarpal pad, respectively. These pad cups 122-126 are particularly visible in FIG. 5. In addition, each of the digital pad cups 122, 123, 124, 125 may also be configured to have a primarily round or tear drop shape when viewed from the top or bottom plan views of FIGS. 2 and 1, respectively, and to have an extended portion, for exemplary purposes such as 125a illustrated in FIG. 2, within which a dog's nails may also be received. As may be apparent, preferred embodiment molded sole 100 will not fit all sizes of dog paws, and so will need to be dimensioned to a single size or limited range of sizes.

In accord with the present invention, it is desirable that the dog feels the ground through the trail boot to accept wearing dog boots. The more comfortable the dog feels while wearing boots, the less likely he is to chew on them or refuse to let the handler put the boot on the paw. Between each of the dog's digital and metatarsal or metacarpal pads, there is a natural separation that allows individual pads to shift up and down and side to side relative to an adjacent pad. However, prior art boots having a more durable sole are effectively rigid, so that the sole inhibits this independent motion sufficiently that the dog loses important sensory input that is otherwise provided by the independent movement of pads.

Figure 2:
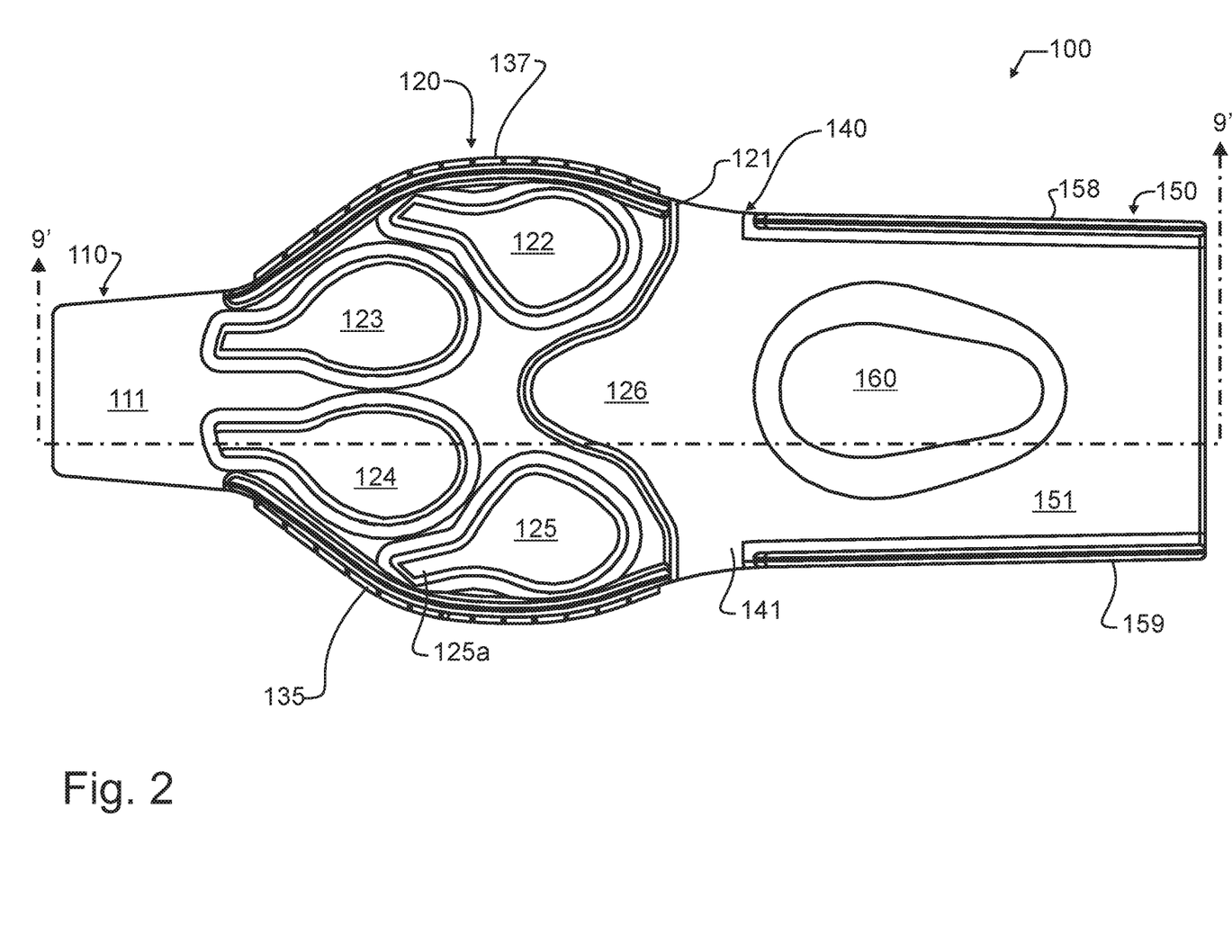
FIG. 2 illustrates the preferred embodiment molded sole of FIG. 1 from a top plan view.
Figure 5:
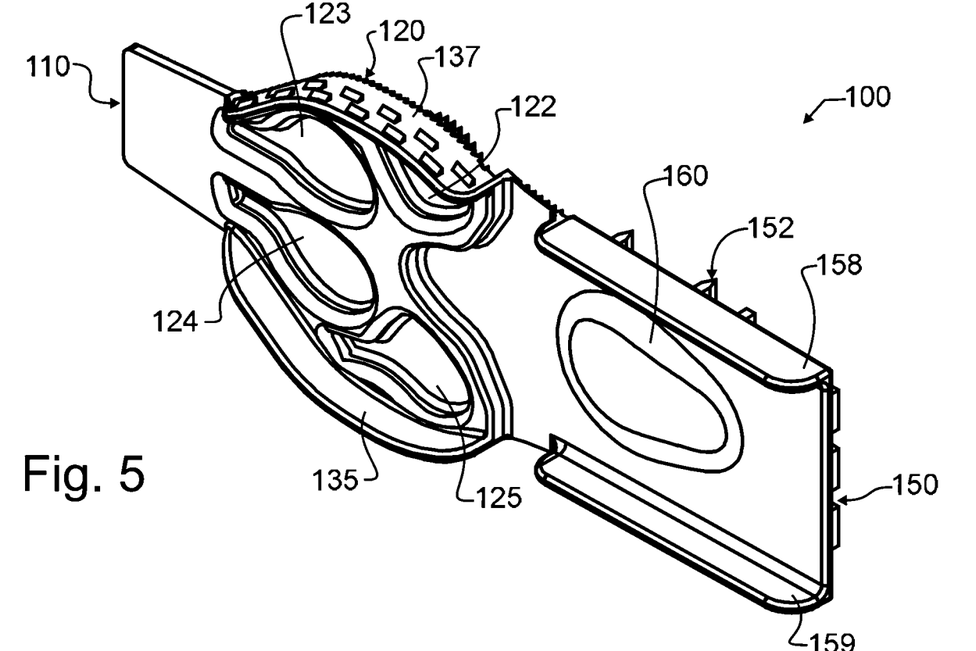
FIG. 5 illustrates the preferred embodiment molded sole of FIG. 1 from a top projected view.

To enable a dog to better feel the ground, in a manner much more closely resembling the natural sensory input, the present invention uses these natural pad separations in the design of preferred embodiment molded sole 100. The generally planar portion 121 of mid-base 120 serves as a plurality of raised lugs that separate each of the pad cups 122-126. The planar portion 121 is preferably fitted into a dog's natural pad separations, and helps to precisely position each of the dog's pads within the appropriate cup. Each pad is received by an associated pad cup, and separated from an adjacent pad cup at the top by a portion of generally planar portion 121 on the interior of the molded base. Consequently, the interior pattern of mid-base 120 visible best in FIGS. 2 and 5 is designed to generally mirror the geometry of a dog's natural paw pad.

For each pad cup 122-126 to function as intended, each pad cup will to at least limited extent move up and down and side to side through at least a functional range relatively uninhibited by adjacent pad cups. In the preferred embodiment, this is achieved with the cup-shaped geometry of each of pad cups 122-126, having a cup base that is configured to be in ground contact on an exterior surface and to be in contact with a dog's pad on an interior surface. The cup sidewalls rise vertically from the cup base, out of contact with a flat ground surface and spaced from the side walls of an adjacent cup. Distal to the cup base the side walls connect to generally planar portion 121. This means that the only connection between adjacent pad cups 122-126 is generally planar portion 121. As long as generally planar portion 121 is sufficiently pliable, each pad cup will then move up and down and side to side through at least a functional range relatively uninhibited by adjacent pad cups.

Figure 1:
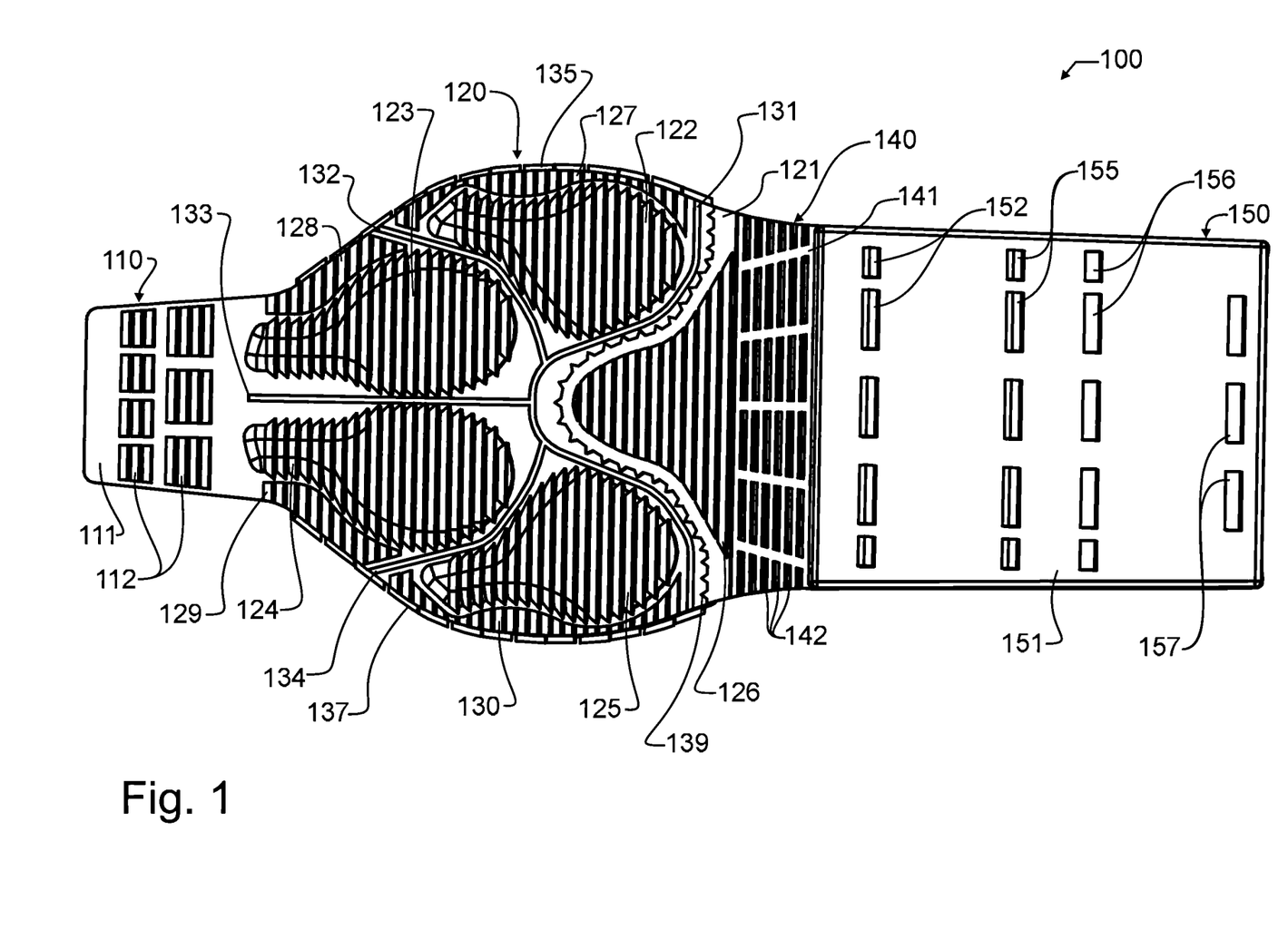
FIG. 1 illustrates a preferred embodiment molded sole designed in accord with the teachings of the present invention from a bottom plan projected view showing the interior exterior surface of the sole.
Figure 6:
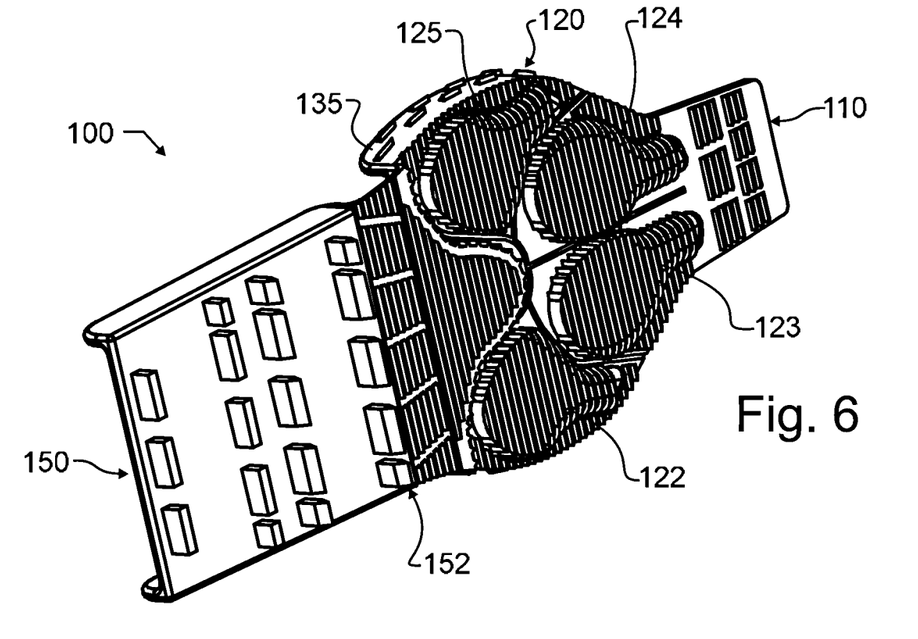
FIG. 6 illustrates the preferred embodiment molded sole of FIG. 1 from a bottom projected view.

While the generally flat sheet geometry of generally planar portion 121 can be sufficient to permit significant flexure between adjacent ones of pad cups 122-126, in preferred embodiment molded sole 100 optional flexure grooves 131, 132, 133, 134 have been provided between adjacent pad cups 122-126. These flexure grooves 131-134 are thinner than generally planar portion 121 and so provide even more flexure and independent movement of individual pad cups 122-126, and consequently improve both feel and comfort for the dog. While they are illustrated in FIGS. 1 and 6 as a single groove, it will also be understood that two or more adjacent grooves may also be provided as desired. Two flexure grooves 131 are, for exemplary purposes, illustrated in FIG. 9.

Flexure in generally planar portion 121, the flexure which may be emphasized or increased by flexure grooves 131-134 or the equivalent, permits each one of pad cups 122-126 to raise or lower to a degree sufficient to be functionally perceived and interpreted by a dog as being relatively independent of adjacent pad cups. Just as each of the dog's pads are ultimately coupled to adjacent pads through connecting flesh, and so cannot travel in an unlimited independent manner, each of pad cups 122-126 are also ultimately coupled to adjacent pad cups through generally planar portion 121. However, with proper design in light of the present disclosure, generally planar portion 121 may be configured to provide little more restriction on the movement of individual pads than a dog's own connecting flesh.

As noted, in preferred embodiment molded sole 100 this relative movement is accomplished by providing open space at and rising from ground level between adjacent cup side walls, and a relatively flexible lug created by generally planar portion 121 at the top of adjacent cup side walls. The flexible lug then acts as a natural hinge that may not only flex, but may also roll to some extent, thereby allowing both side to side and also upward and downward relative motion between adjacent pad cups.

Unfortunately, any time a flexible material that defines vertically rising side walls that are connected at a top is used to traverse an irregular and inconsistent surface such as gravel, there is also a likelihood that eventually a piece of the gravel which is of just the right dimension will be pressed between adjacent side walls and will tend to stick or become wedged there between. While this may happen with preferred embodiment molded sole 100, several features work in combination to prevent this from being detrimental to the dog. First, and as visible in FIGS. 1 and 6, the cup side walls are preferably quite vertical. This helps to limit the size of material that can wedge in the first place to a relatively small range. In the event matter does wedge in, and regardless of how vertical the cup side walls are, the inherent hinging nature of the lugs defined by generally planar portion 121 and flexure grooves 131-134 will, as the dog traverses a surface, act to cause adjacent pads to shift closer to and farther from each other. When one pad shifts farther from an adjacent pad, the space between increases, allowing any wedged matter to drop out and no longer present a problem. Consequently, any matter that may wedge between pad cups will be quite transient, and the cup side walls will help to protect the dog paw from harm by this transient matter.

In an alternative embodiment, the open space between cup side walls present in mid-base 120 may be filled with a relatively more resilient material than that used for the fabrication of the rest of mid-base 120. Such material thereby fills the void and acts to prevent matter from wedging into the open spaces in the first place. By being more resilient, this fill material is configured to have relatively less effect on flexure than that of generally planar portion 121. However, the formation of a second material adds an additional molding operation. In addition, the lower density material will in many cases also be less durable, and so may tend to wear, eventually capturing matter rather than preventing the matter from collecting. Consequently, a particularly durable lower density material may be desired for some embodiments.

In yet another alternative embodiment, a resilient rubber or elastomeric membrane may cover the spaces to block access of matter to the voids. Nevertheless, the resilient rubber membrane may suffer from the same limitation as a lower density material, initially closing the void, but through wear and tear opening up and retaining matter therein. Again, a particularly durable resilient membrane may be desired for some embodiments.

As will be understood, wet slippery conditions tend to be a problem without some type of raised surface on the base of the boot. When the dog accelerates from a walk to a run, braking and pivoting require traction to prevent injury to the dog. Prior art boots provide good traction indoors with a tacky but smooth surface. Unfortunately, this type of surface is less effective outdoors. Consequently, some conditions require a raised lug of some type on the bottom to provide traction in loose gravel, rock, or on icy or wet terrain. Preferred embodiment molded sole 100 may preferably provide a textured exterior surface to each of the pad cups 122-126 such as a plurality of treads as illustrated for example in FIG. 1. These treads allow relatively greater flexure about an axis transverse to preferred embodiment molded sole 100, giving the sole more flexure in this direction to provide a more comfortable roll as the dog walks or runs. While not essential, these treads are preferably configured to have a geometry resembling a right triangle prism, similar to and with the similar benefits to those of treads 112 already discussed herein above. The particular texturing is not critical to the proper function of the invention, and other patterns or geometries besides the right triangle prism and such as are known in the art of both pet and human foot coverings will be considered to be incorporated herein. In one alternative embodiment, the sole exterior may incorporate means for attaching studs or other custom exterior features.

In addition to the treads provided on each of the pad cups 122-126, optional treads 127, 128, 129, 130 may also be provided in areas adjacent to each of the pad cups 122-126. These treads 127-130 are deemed as optional because, as best illustrated in FIG. 6, these treads must either be substantially taller than the treads of pad cups 122-126 or they will only contact a ground surface when the surface is particularly soft or conformal, such as would be the case with unpacked snow, mud, or soft sand.

Sidewalls 135, 137 provide secure containment and proper positioning of the dog's paw, and also provide a convenient attachment point for a boot upper. Optional sidewall treads 136, 138 provide some limited additional traction particularly when a dog is turning a corner, and may provide additional limited benefit in soft or conformal ground surfaces such as the aforementioned unpacked snow, mud, or soft sand, and may also provide a conformal protective bumper that helps to soften impact with vertical surfaces such as rock edges, trees, and other objects which the side of the dog's paw might otherwise impact. The relative sparsity of these sidewall treads 136, 138 ensures that such impact will be relatively cushioned, and yet the staggered rows of right triangle prism treads will provide good engagement with the aforementioned soft ground surfaces to help reduce the rate at which the dog paw will sink, while interfering less with rate of withdrawal.

As noted herein above, when a dog is trying to stop quickly, it will shift the paws rearward, applying less force to the nails and more to the metatarsal and metacarpal pads. To facilitate stopping, and using this shift advantageously, an optional metatarsal or metacarpal pad vertical side wall tread 139 such as is visible in FIG. 1 is also provided. This metatarsal or metacarpal pad vertical side wall tread 139 will preferably better engage with a surface when the dog is trying to stop than a smooth or untreated surface would. Serrations are provided thereon to improve such stopping.

To further improve the dog's ability to stop or brake, and to also improve the ability for a dog to run or pull in full stride, a metatarsal or metacarpal pad rear wall 140 is provided that has a metatarsal or metacarpal pad rear wall generally planar portion 141 and a plurality of metatarsal or metacarpal pad rear wall treads 142. Since these rear wall treads 142 may be bi-directionally functional, they are not directionally oriented in the manner that treads 112 are. Instead, in preferred embodiment molded sole 100 these rear wall treads 142 are symmetrical about a vertical transverse plane.

Affixed with and extending from mid-base 120 distally from and in a directional generally opposed to toe 110 is tail 150. Tail 150 has a generally planar portion 151 that in preferred embodiment molded sole 100 is generally coplanar with generally planar portion 141. Extending downward therefrom, and particularly visible in FIGS. 1, 3, 4, and 6, are a plurality of treads 152, 155 that may be relatively larger than treads 112, 142. Treads 152 define a first generally transverse row of protrusions extending out from generally planar portion 151. At least one, and preferably all of treads 152 have a geometry that includes a generally rectangular parallelepiped base 153 and further has a chiseled point 154 distal to generally planar portion 151. Treads 155 define a second generally transverse row of protrusions also extending out from generally planar portion 151. Treads 155 may optionally but preferably have a geometry like that of treads 152. These two parallel rows of large treads 152, 155 perform several diverse functions. These two parallel rows define a strip or valley between them into which a strap may be wrapped. Consequently, the strap will be prevented from either sliding toward or away from mid-base 120. In addition, and as noted herein above, when a dog is either trying to stop or striding, they may occasionally put more of their paw, farther up the leg, in contact with the ground. For example, when stopping or descending a slope, the dog may engage the carpal pad. In such postural position, treads 152, 155 will engage with the ground, further improving the dog's traction. Two more rows of treads 156, 157 may also be provided. These treads 156, 157 may engage the ground, but this is unlikely and so these may instead optionally but preferably have a generally rectangular parallelepiped geometry. Tail sidewalls 158, 159 in a manner similar to sidewalls 135, 137 help to locate the dog's upper paw and provide a good coupler to a boot upper.

Most preferably within tail 150 there is a raised protrusion 160. This raised protrusion 160 functions in a manner similar to that of the rear foam pad described in our U.S. Pat. Nos. 7,971,557; 8,113,152; 9,485,962; and 9,497,932 incorporated by reference herein above, and in one alternative embodiment, may be implement as described therein. However, in preferred embodiment molded sole 100, raised protrusion 160 may be formed unitarily within tail 150. This simplifies fabrication and enables a relatively precise and predictable geometry to be formed.

In some alternative embodiments contemplated herein, raised protrusion 160 described in these patents as preferably being in engagement with the dog's metatarsal or metacarpal pad adjacent to a ground surface will be adjustable to accommodate dogs having different leg geometry. In some of these embodiments, raised protrusion 160 may then be affixed with a suitable fastener selected from the myriad of known fasteners including but not limited to permanent and removable fasteners. In one embodiment, raised protrusion 160 may be attached with hook and loop such as commercially sold under the Velcro trademark, with the loop material sewn on the back of the boot, and the hook attached to the foam pad. The foam pad in such case may further be provided with a slip cover such as plastic, paper, or other suitable material to allow a pet owner to slip the foam pad into the boot, position it, and then remove the slip cover for ease of attachment. This slip cover allows a person to easily set the pad and then not have to think about or adjust the pad again. A slip cover of this type may be used with various other permanent and removable fasteners.

The material used to fabricate a molded sole in accord with the teachings of the present invention is not critical, but may for exemplary purposes comprise a semi-rigid rubber or foamed rubber, including but not limited to neoprene. Further, the density, rigidity, durometer, coefficient of friction, and toughness of the molded sole may be varied by composition and density of the sole material to meet particular applications. Factors which will need to be considered include, but are not limited to, the comfort of the boot, the coefficient of friction, and the durability, the first two which are generally in opposition of the durability. Nevertheless, the provision of flexure grooves 131, 132, 133, 134 as noted herein above allows the use of more durable material, while still obtaining a desired flexibility and comfort for a dog. Another factor that may enter into the selection of the material is density. When the density of a boot fabricated from preferred embodiment molded sole 100 is less than that of water, then the boot will float, improving utility for some applications.

Figure 7:
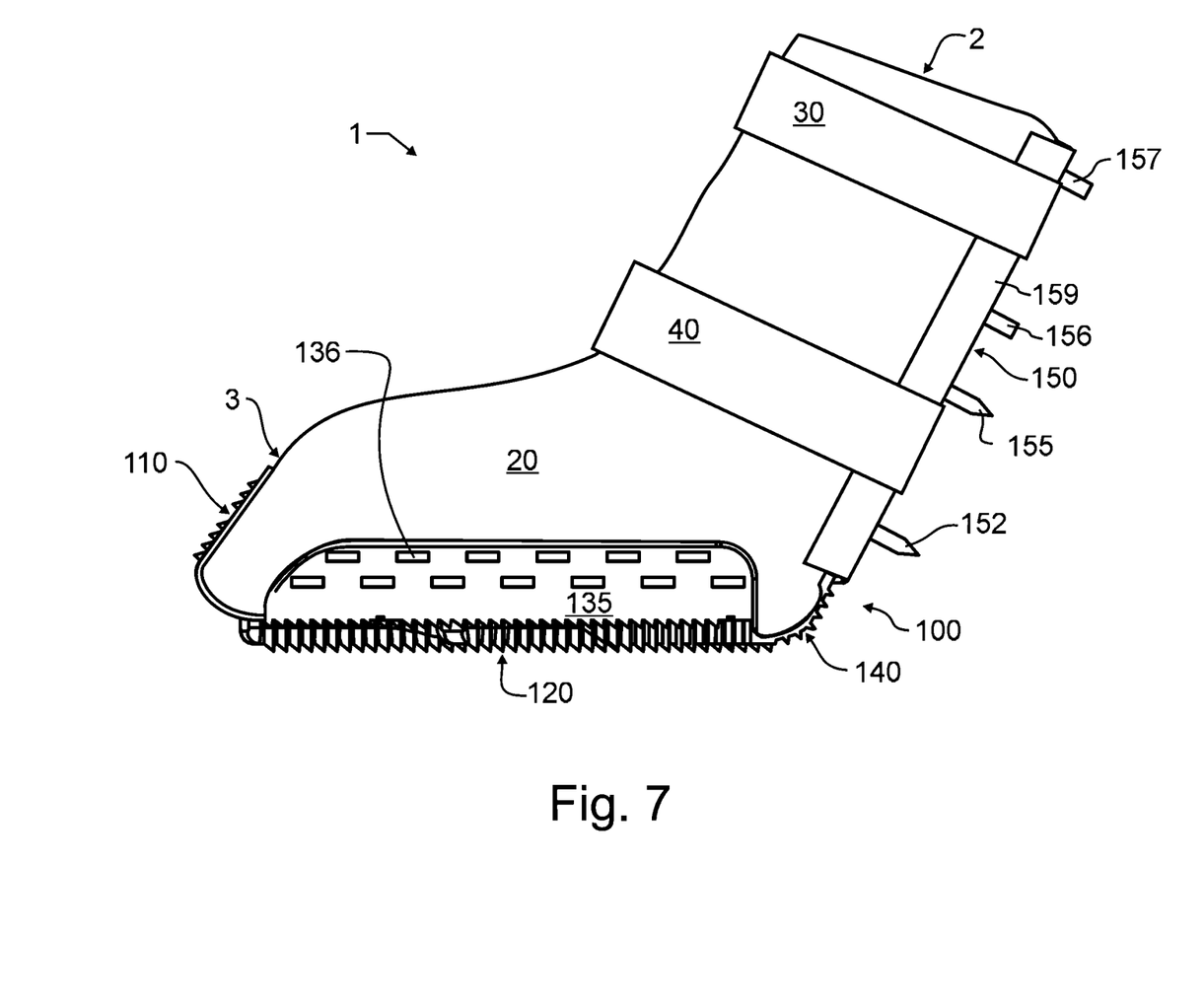
FIG. 7 illustrates a preferred embodiment trail boot incorporating the preferred embodiment molded sole of FIG. 1.
Figure 8:
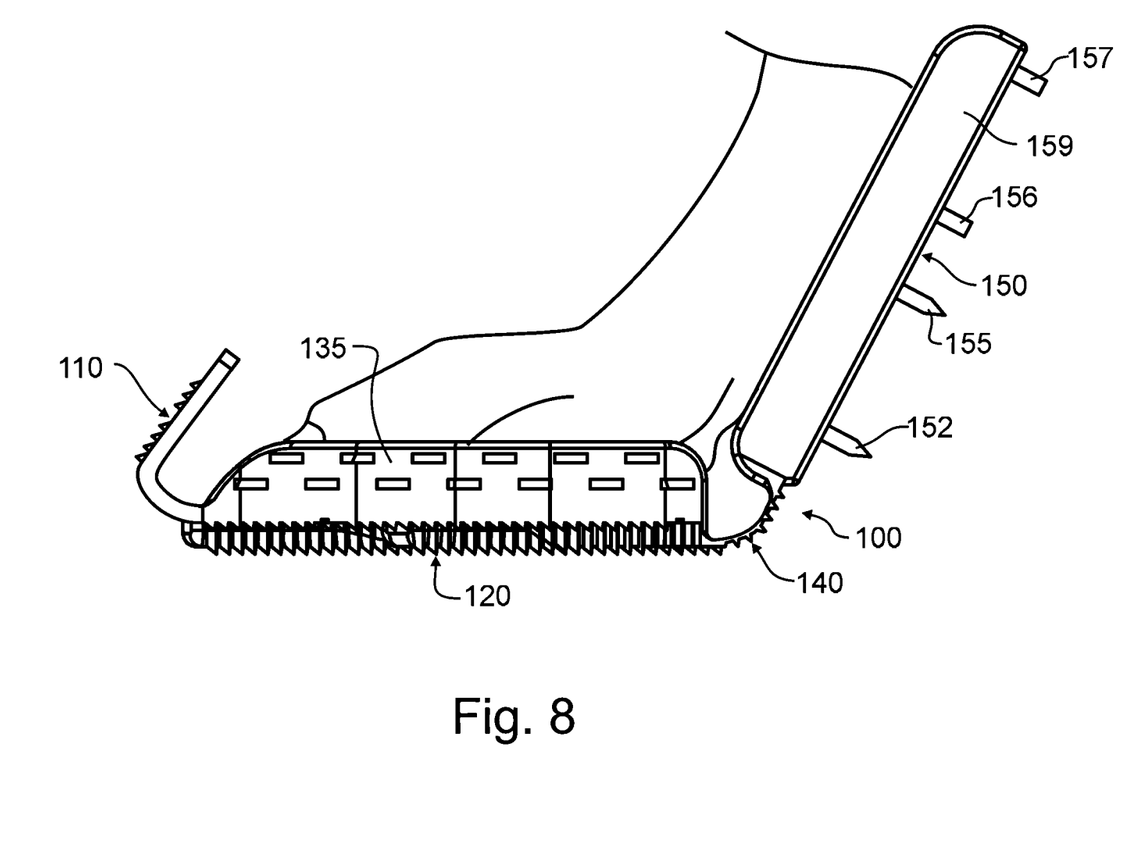
FIG. 8 illustrates the preferred embodiment trail boot of FIG. 7 but with the upper and straps removed to reveal the preferred embodiment molded sole of FIG. 1 in further combination with a dog paw.
Figure 9:
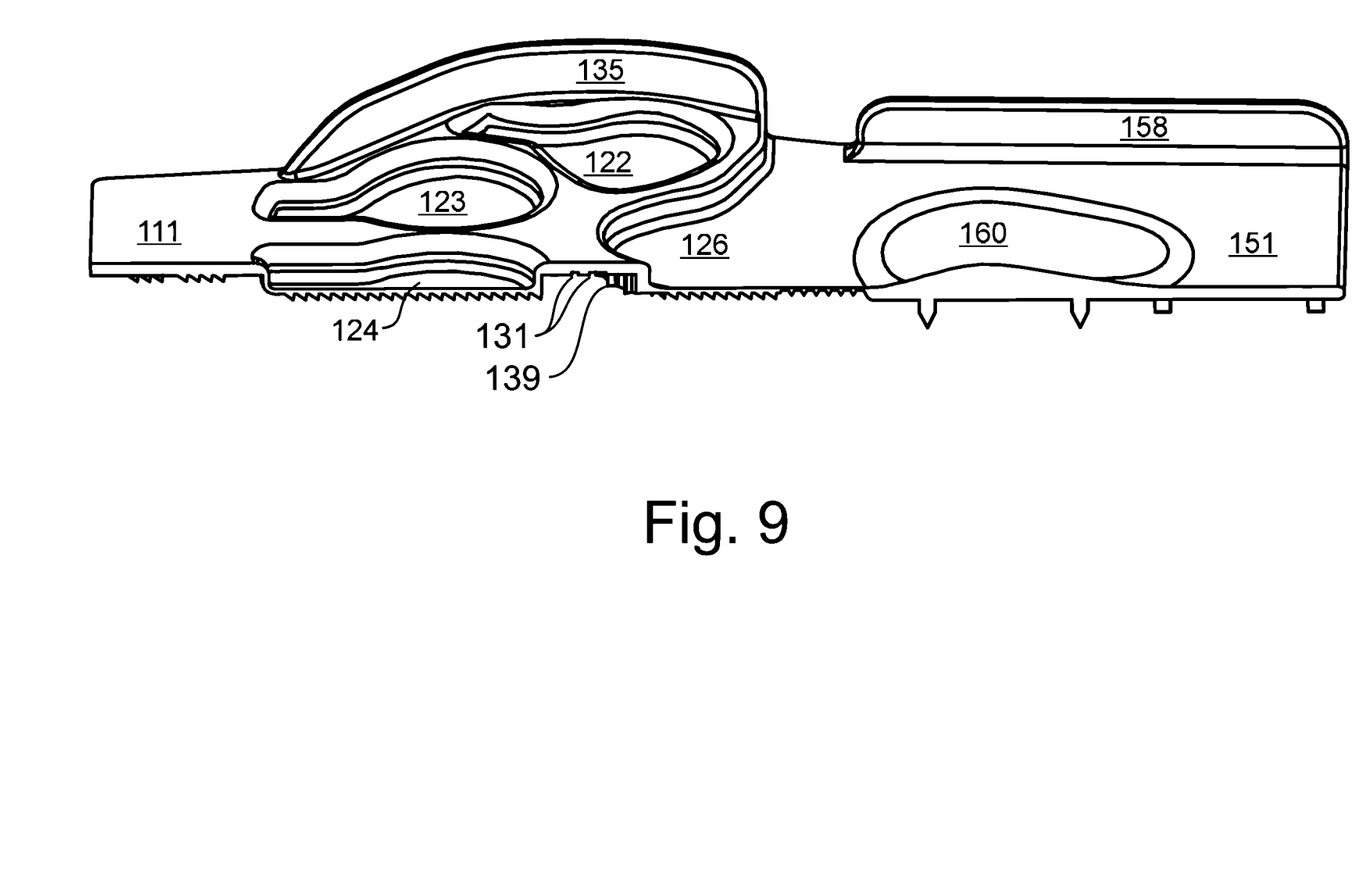
FIG. 9 illustrates the preferred embodiment molded sole of FIG. 1 from a projected and vertical plane sectional view taken along section line 9' in FIG. 2.
Figure 10:
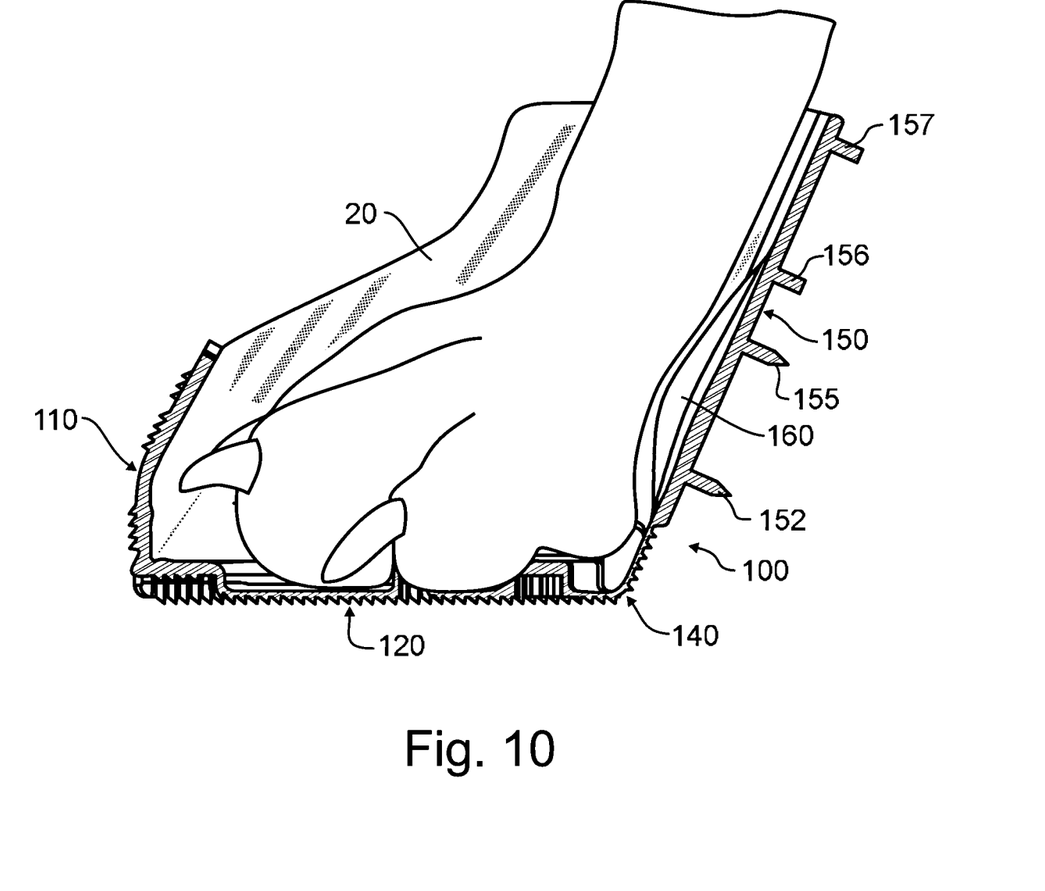
FIG. 10 illustrates the preferred embodiment molded sole of FIG. 9 and in the position of and in further combination with the dog paw as illustrated in FIG. 8, and with a boot upper affixed to the molded sole.

FIG. 7 illustrates a preferred embodiment trail boot 1 incorporating preferred embodiment molded sole 100, while FIGS. 8-10 open up preferred embodiment trail boot 1 for illustrative purposes by not illustrating a boot top 20 and straps 30, 40 in FIG. 8. FIG. 9 illustrates just molded sole 100 as manufactured in flat form from sectional view, while FIG. 10 illustrates this sectional view of molded sole 100 shaped and coupled to boot top 20 and with a dog paw therein.

Turning first to FIG. 7, boot 1 has the appearance of a flexible or somewhat flaccid tube, with a closed end 3 defined by toe 110 and an open end 2 distal therefrom. As may be apparent, this simple and generally tubular construction in combination with straps 30, 40 ensures that preferred embodiment trail boot 1 may be readily, quickly, and intuitively placed about a dog's paw.

Boot 1 includes preferred embodiment molded sole 100 having a non-slip ground-engaging mid-base 120. The bottom of preferred embodiment boot 1 is covered from closed end 3 up to straps 30, 40 with preferred embodiment molded sole 100. This continuity ensures that the significant forces applied to a boot by a dog are securely coupled between the dog paw and molded sole 100 at several locations, including each of the pad cups 122-126 and adjacent generally planar portion 121, as well as into tail 150 and the associated straps 30, 40, and raised protrusion 160. With a structurally sound molded sole 100, this ensures that preferred embodiment trail boot 1 is secured against slippage, spin, or separation with respect to the dog's leg, while the thereby precisely located raised protrusion 160 simultaneously substantially reduces the risk of circulatory disruption or harm to the dog. This safe and secure coupling between preferred embodiment trail boot 1 and a dog's leg not only keeps the boot on, but also helps to ensure that the boot does not unduly abrade the dog during use.

Flexibility of preferred embodiment trail boot 1 is an extremely important feature to provide comfort and a natural feel for the canine. Preferred embodiment molded sole 100 will allow for enhanced traction in "trail" situations and provide greater durability for many canines when recreating or working in rough abrasive terrain. This preferred embodiment trail boot 1 is designed to feel very natural to the dog and allow them to wear the boots for longer periods of time.

Boot top 20 preferably comprises a relatively soft, compliant, durable, and strong material that is resistant to the elements. Standard nylon, ballistic nylon, or Cordura is most preferred, owing to the relatively low cost, inherent durability, ready fabrication, and permeability to gasses, while still providing some water resistance. With somewhat larger exposed surface area, the breathable nature of a woven or non-woven fabric will be very beneficial in many applications. In alternative embodiments, boot 1 may incorporate a breathable mesh panel for summer, and a waterproof design for winter. Boot top 20 may preferably be coupled to toe 110, sidewalls 135, 137 metatarsal or metacarpal pad rear wall 140, and tail sidewalls 158, 159 using a suitable fastener such as an adhesive, stitching, and other suitable technique.

As shown in the preferred embodiment boot 1, toe 110 provides protection when a dog, for whatever reason, drags the toe. Toe 110 will help prevent serious damage to boot 1 as well as to the dog's foot, and so is preferably a strong, abrasion resistant material. In some instances, such as in the case of a dog with neuropathy or other disorder, the dog may tend to drag their paw. In such instances, a hard or substantially more durable overlay may be provided in addition to or as an integral expansion to toe 110, to protect boot top 20 and the dog's paw from harm.

Strap 30, which is relatively close to the open end 2 of boot 1, would potentially slip above open end 2, and so become less effective. To prevent such slippage from occurring, treads 156, 157 are provided at the top back of boot 1, adjacent open end 2. These treads limit strap 30 from either sliding up or down. The similar treads 152, 155 likewise limit strap 40 from either sliding up or down. While not separately illustrated, but if so desired, features may be provided to permanently secure straps 30, 40 to tail 150 or to boot top 20.

Treads 112, 142, 152, 155, and 156 are each segments of a broken transverse line of treads. These segments are used instead of a continuous transverse tread to permit greater flexibility, so that for exemplary purposes tail 150 may wrap or curve about a dog's paw and leg into a more generally tubular configuration. If these treads 112, 142, 152, 155, and 156 were unbroken, the treads would undesirably stiffen preferred embodiment molded sole 100.

Raised protrusion 160 will most preferably extend on an inside of tail 150, within a circumference of contraction created by strap 40 when strap 40 is tightened about the leg of a dog. In practice, raised protrusion 160 prevents undesirable constriction of a dog's leg, while at the same time forming a relatively high friction contact with the dog's leg, to help to ensure that boot 1 does not slip off. Noteworthy here is the fact that Cordura and ordinary nylons are generally relatively slippery, though these same materials are very durable and desirable for their intrinsic durability. Consequently, to use a durable and flexible nylon without the present synergy of raised protrusion 160 will result in the boots sliding from the dog's legs. Raised protrusion 160 will also ensure a relatively complete surface contact with an otherwise non-cylindrical leg, which also helps to ensure even force distribution about the entire circumference of contraction formed by strap 40.

Most preferably, preferred embodiment trail boot 1 will be dimensioned to cooperate with the intrinsic geometry of a dog paw. In this regard, it is noted that most dog paws are slightly wider at the pad than they are in the leg region slightly above and immediately adjacent the pad. Consequently, with reasonable sizing and placement, raised protrusion 160 will be placed on the leg adjacent the dog's metatarsal or metacarpal pad, and strap 40 will secure raised protrusion 160 in that position. Such placement ensures that the bulge at the dog's metatarsal or metacarpal pad will produce interference with raised protrusion 160, thereby preventing raised protrusion 160 from sliding down into the dog's pad region. As may be apparent, preferred embodiment trail boot 1 will readily accommodate a wide range of proportions of paw size to leg diameter.

In accord with the present teachings, several further alternative embodiment boots are additionally contemplated herein, including in one embodiment the provision of smaller sized boots for rear paws, and in a further embodiment providing color coding or other indicia to the differently sized front and rear boots to easily tell which boots are for front paws and which are for back paws.

Figure 11:
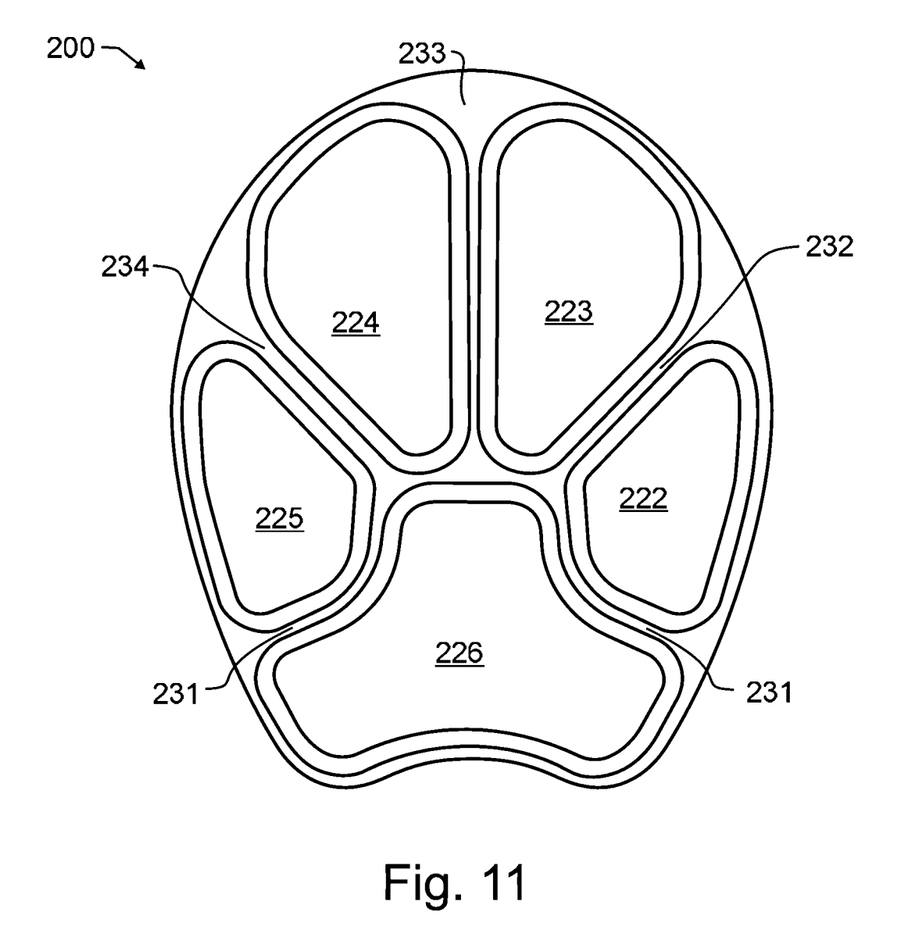
FIG. 11 illustrates a preferred embodiment pad that may preferably be used in conjunction with the preferred embodiment molded sole of FIG. 1 from a bottom view.
Figure 12:
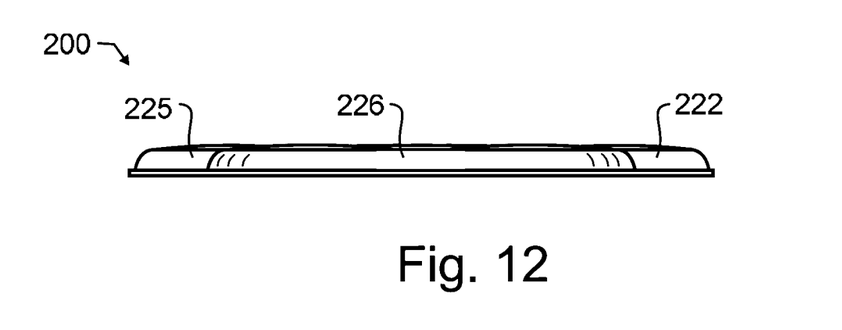
FIG. 12 illustrates the preferred embodiment pad of FIG. 11 from a rear view.
Figure 13:
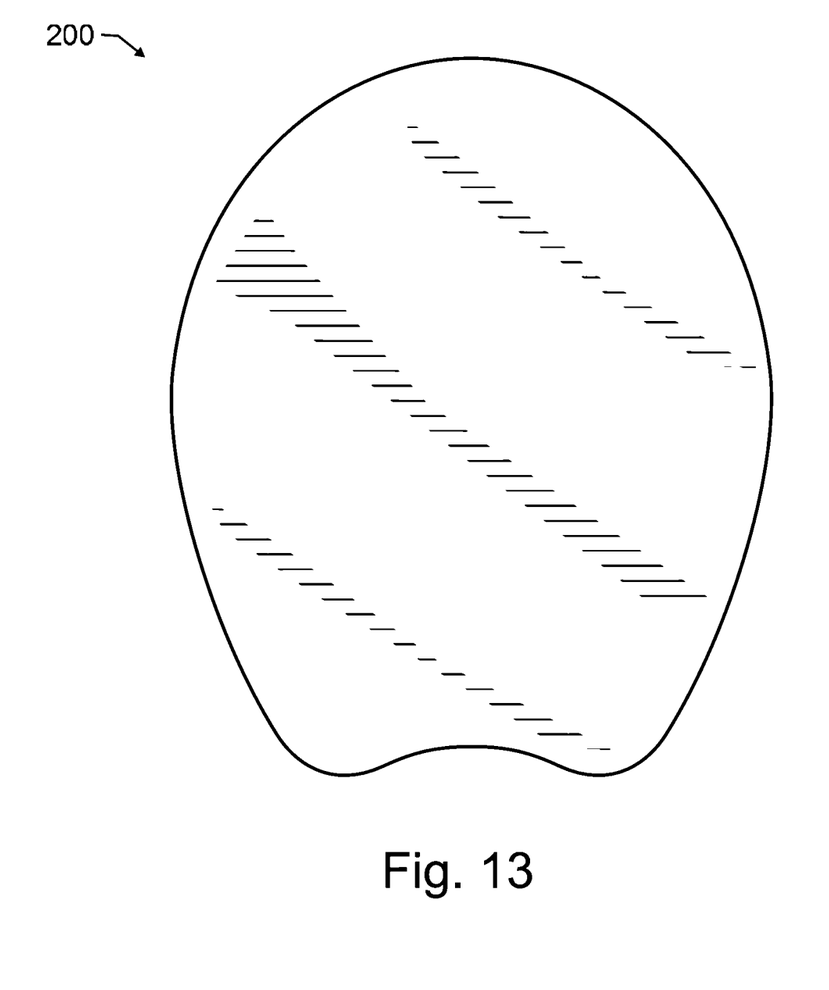
FIG. 13 illustrates the preferred embodiment pad of FIG. 11 from a top view.

Preferred embodiment molded sole 100 may optionally be provided with a preferred embodiment pad 200, such as illustrated in FIGS. 11-13, that may be placed between the dog's paw and mid-base 120 as a bottom pad liner inside preferred embodiment trail boot 1. While such a pad may take many different geometries and materials, including a sheet liner, preferred embodiment pad 200 preferably is a form-fitting foam that has a geometry that conforms to the pad shape of the dog's foot and which engages in corresponding features found within preferred embodiment molded sole 100. A generally planar portion 221 forms the primary web which interconnects or binds together each of a plurality of digital pads 222, 223, 224, 225 and a metatarsal or metacarpal pad 226. Since generally planar portion 221 is relatively thinner than these pads 222-226, and since there is a small gap between each adjacent one of pads 222-226, this has the effect of creating flexure grooves 231, 232, 233, 234 between the pads. As may be apparent then, preferred embodiment pad 200 will not interfere with the relatively independent flexure of each of the cups 122-126 in preferred embodiment molded sole 100.

Most preferably, preferred embodiment pad 200 will be fabricated from a material with a high coefficient of friction to keep the insert in place. The combination of mating geometry and relatively high coefficient of friction will in some cases be sufficient to maintain preferred embodiment pad 200 in position relative to preferred embodiment molded sole 100. Nevertheless, in an alternative embodiment pad 200 may be affixed to preferred embodiment molded sole 100, such as with temporary or permanent adhesive, fasteners of all sorts including hook and loop and all other known and suitable types, sewing, welding or other suitable technique.

Preferred embodiment pad 200 may provide protection against the environment and elements, such as but not limited to adding puncture resistance, thermal barrier, and other desired characteristics. This may for exemplary and non-limiting purposes be achieved in alternative embodiments by providing appropriate layers within generally planar portion 221, or in an alternative embodiment by providing appropriate layers adjacent to generally planar portion 221. If a dog owner wants cooling, heating, or penetration protection they would then put in a particular type of preferred embodiment pad 200 having a suitable layer or layers within or adjacent to generally planar portion 221 designed for and configured to provide the appropriate type(s) of protection.

Preferred embodiment pad 200 will also preferably collapse under the weight of the dog sufficiently so that pads 222-226 not only fit within pad cups 122-126, but also provide sufficient space within pad cups 122-126 to still receive a dog's pads therein. The use of a foam material helps to ensure this conformance to the dog's paw geometry, and can be used to enable a standard boot to better conform to a greater variety of dog paw geometries.

From these foregoing figures, additional features and options become more apparent. First of all, the components disclosed herein may be manufactured from a variety of materials, including metals, resins and plastics, ceramics or cementitious materials, composites, natural fibers or even combinations of the above. The specific material used may vary depending upon a particular application and various cost and durability considerations, as well as other considerations that will be understood from the present disclosure or otherwise well-known and understood by those reasonably skilled in the art.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A canine trail boot comprising:
 a boot top;
 a sole coupled to said boot top to define a paw receiving space there between, wherein said sole further comprises:
  a toe rising from said paw receiving space and having a plurality of unidirectional treads; and
  a tail rising from said paw receiving space;
 said sole having five pad cups including four digital pad cups and a fifth metatarsal metacarpal pad cup;
 each of said five pad cups having
  a cup base exterior surface that is configured to be in ground contact and an interior surface that is configured to be in contact with and receive a single dog's pad,
  a cup sidewall that rises vertically from said cup base and configured to rise to a location between and separating adjacent ones of a dog's pads substantially out of contact with a flat ground surface and spaced in a portion adjacent to said ground surface by a void from a vertically rising side wall of an adjacent one of said five pad cups, and
  a flexible lug coupling said cup sidewall to said adjacent one of said five pad cups in a portion of the cup side wall distal to said cup base.

2. The canine trail boot of claim 1, wherein said tail further comprises an omnidirectional tread.

3. The canine trail boot of claim 1, wherein said tail further comprises a pair of generally linear treads spaced from each other and configured to engage with a ground surface, said pair of generally linear treads further configured to receive and retain a strap tensioned about a dog's leg.

4. The canine trail boot of claim 1, wherein said toe unidirectional treads further comprise a right triangular prism geometry.

5. The canine trail boot of claim 1, wherein said toe unidirectional treads further comprise segmented treads.

6. The animal boot of claim 1, wherein said flexible lug further comprises a sheet geometry.

7. The canine trail boot of claim 1, wherein said sole comprises a molded sole.

8. The canine trail boot of claim 1, wherein said flexible lug is configured to be sufficiently pliable to permit each pad cup to move both up and down and side to side through at least a functional range effective to mimic independent pad motion in a dog that is relatively uninhibited by adjacent pad cups.

9. An animal boot comprising:
 a boot top; and
 a molded sole coupled to said boot top to define a paw receiving space there between;
 said molded sole having a flexible lug coupled to at least two pad cups, wherein said molded sole further comprises:
  a toe rising from a first edge of said paw receiving space; and a tail rising from a second edge of said paw receiving space, said second edge of said paw receiving space distal to said first edge of said paw receiving space, wherein said tail further comprises a pair of generally linear treads spaced from each other, said generally linear treads configured to engage with a ground surface, and further configured to receive and retain a tensioned strap inbetween said pair of generally linear treads;

each of said two pad cups having
- a cup base exterior surface that is configured to be in ground contact and an interior surface that is configured to be in contact with and receive a single dog's pad,
- a cup sidewall that rises vertically from said cup base configured to be at a location between and separating adjacent dog's pads and substantially out of contact with a flat ground surface and spaced from a vertically rising side wall of an adjacent one of said at least wo pad cups, and
- a coupling between said cup sidewall and said flexible lug distal to said cup base;

said flexible lug configured to separate a first one of said at least two pads from a second one of said two pad cups at a location between and separating adjacent dog's pads, said flexible lug further configured to be sufficiently pliable to permit each pad cup to move both up and down and side to side through at least a functional range effective to mimic independent pad motion in a dog that is relatively uninhibited by adjacent pad cups.

10. The animal boot of claim 9, wherein said tail generally linear treads further comprise segmented treads configured to wrap at least partially about a dog's leg.

11. The animal boot of claim 9, wherein each of said digital pad cups further comprise an extended portion configured to receive a dog's nails.

12. The unitary canine boot sole of claim 9, wherein said tail further comprises an omnidirectional tread.

13. The unitary canine boot sole of claim 12, wherein said toe further comprises unidirectional treads having a right triangular prism geometry.

14. The unitary canine boot sole of claim 13, wherein said unidirectional treads further rise from a toe generally planar portion and said right triangular prism geometry of said toe unidirectional treads further comprises a face of said right triangle prism that is perpendicular to said generally planar portion and faces to said tail.

* * * * *